(12) United States Patent
Altendorf et al.

(10) Patent No.: US 11,500,349 B2
(45) Date of Patent: Nov. 15, 2022

(54) METHOD FOR PARAMETERIZING AN AUTOMATION FIELD DEVICE

(71) Applicant: Endress+Hauser Process Solutions AG, Reinach (CH)

(72) Inventors: Matthias Altendorf, Lörrach (DE); Eugenio Ferreira da Silva Neto, Biel-Benken (CH); Andreas Hofmann, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 590 days.

(21) Appl. No.: 16/489,540

(22) PCT Filed: Feb. 15, 2018

(86) PCT No.: PCT/EP2018/053762
§ 371 (c)(1),
(2) Date: Aug. 28, 2019

(87) PCT Pub. No.: WO2018/162203
PCT Pub. Date: Sep. 13, 2018

(65) Prior Publication Data
US 2020/0012249 A1    Jan. 9, 2020

(30) Foreign Application Priority Data

Mar. 8, 2017    (DE) ..................... 10 2017 104 912.6

(51) Int. Cl.
*G05B 19/042*    (2006.01)
*G06F 16/2458*    (2019.01)
(Continued)

(52) U.S. Cl.
CPC ..... *G05B 19/0426* (2013.01); *G06F 16/2458* (2019.01); *G06N 20/00* (2019.01);
(Continued)

(58) Field of Classification Search
CPC ...... G05B 19/0426; G05B 2219/25056; G05B 2219/25061; G06F 16/2458; G06N 20/00; H04W 12/06
See application file for complete search history.

(56) References Cited

U.S. PATENT DOCUMENTS

2004/0143170 A1* 7/2004 DuRousseau .......... A61B 5/164
600/595
2007/0255520 A1* 11/2007 Becker ................. G05B 19/042
702/127

(Continued)

FOREIGN PATENT DOCUMENTS

CN    103312794 A    9/2013
CN    103621013 A    3/2014
(Continued)

*Primary Examiner* — Tuan C Dao
(74) *Attorney, Agent, or Firm* — Mark A. Logan; Endress+Hauser (USA) Holding Inc.

(57) ABSTRACT

The present disclosure relates to a method for parameterizing an automation field device which is communicatively connected to a server, having the following steps: initiating the method by transmitting a command to parameterize the field device on the server; transmitting identification information of the field device to the server; ascertaining a digital image of the field device stored on the server using the transmitted identification information, said digital image containing configuration settings of the field device and measurement location-relevant information and being designed to reproduce the behavior of the field device in a simulated or emulated manner; generating and proposing a parameter set for the field device using the field device information; selecting and confirming the proposed parameter set by a user; and transmitting the confirmed parameter set to the field device and parameterizing the field device using the transmitted parameter set.

15 Claims, 1 Drawing Sheet

(51) Int. Cl.
*G06N 20/00* (2019.01)
*H04L 9/40* (2022.01)
*H04W 12/06* (2021.01)

(52) U.S. Cl.
CPC ......... *H04L 63/0861* (2013.01); *H04W 12/06* (2013.01); *G05B 2219/25056* (2013.01); *G05B 2219/25061* (2013.01)

(56) References Cited

U.S. PATENT DOCUMENTS

| | | | | |
|---|---|---|---|---|
| 2008/0155006 A1* | 6/2008 | Franklin | ................. | H04L 67/34 709/200 |
| 2013/0006399 A1* | 1/2013 | Tandon | .............. | G05B 19/0423 700/88 |
| 2014/0122702 A1* | 5/2014 | Jung | .................. | H04L 63/0421 709/224 |
| 2014/0162598 A1* | 6/2014 | Villa-Real | .......... | G06Q 20/3227 455/411 |
| 2014/0203959 A1* | 7/2014 | Kriel | ........................ | G06K 9/62 342/52 |
| 2014/0270480 A1* | 9/2014 | Boardman | .............. | G06T 17/00 382/154 |
| 2014/0336795 A1* | 11/2014 | Asenjo | ............... | G05B 19/4083 700/86 |
| 2015/0198938 A1* | 7/2015 | Steele | .................... | B25J 9/1689 700/275 |
| 2015/0355631 A1* | 12/2015 | Ochiai | ................. | G05B 19/418 700/19 |
| 2016/0182323 A1* | 6/2016 | Ferguson | ............... | H04L 43/045 709/224 |
| 2016/0274553 A1* | 9/2016 | Strohmenger | .......... | G05B 17/02 |
| 2016/0284128 A1* | 9/2016 | Michalscheck | ...... | G05B 19/409 |
| 2018/0210429 A1* | 7/2018 | Jundt | ..................... | G05B 23/02 |

FOREIGN PATENT DOCUMENTS

| | | |
|---|---|---|
| CN | 104375473 A | 2/2015 |
| DE | 2004042482 A1 | 5/2004 |
| DE | 102004029024 A1 | 2/2005 |
| DE | 102007062395 A1 | 6/2009 |
| DE | 102010029952 A1 | 12/2011 |
| DE | 102012107673 A1 | 5/2014 |
| DE | 102012112842 A1 | 6/2014 |
| DE | 102014111733 A1 | 2/2016 |

* cited by examiner

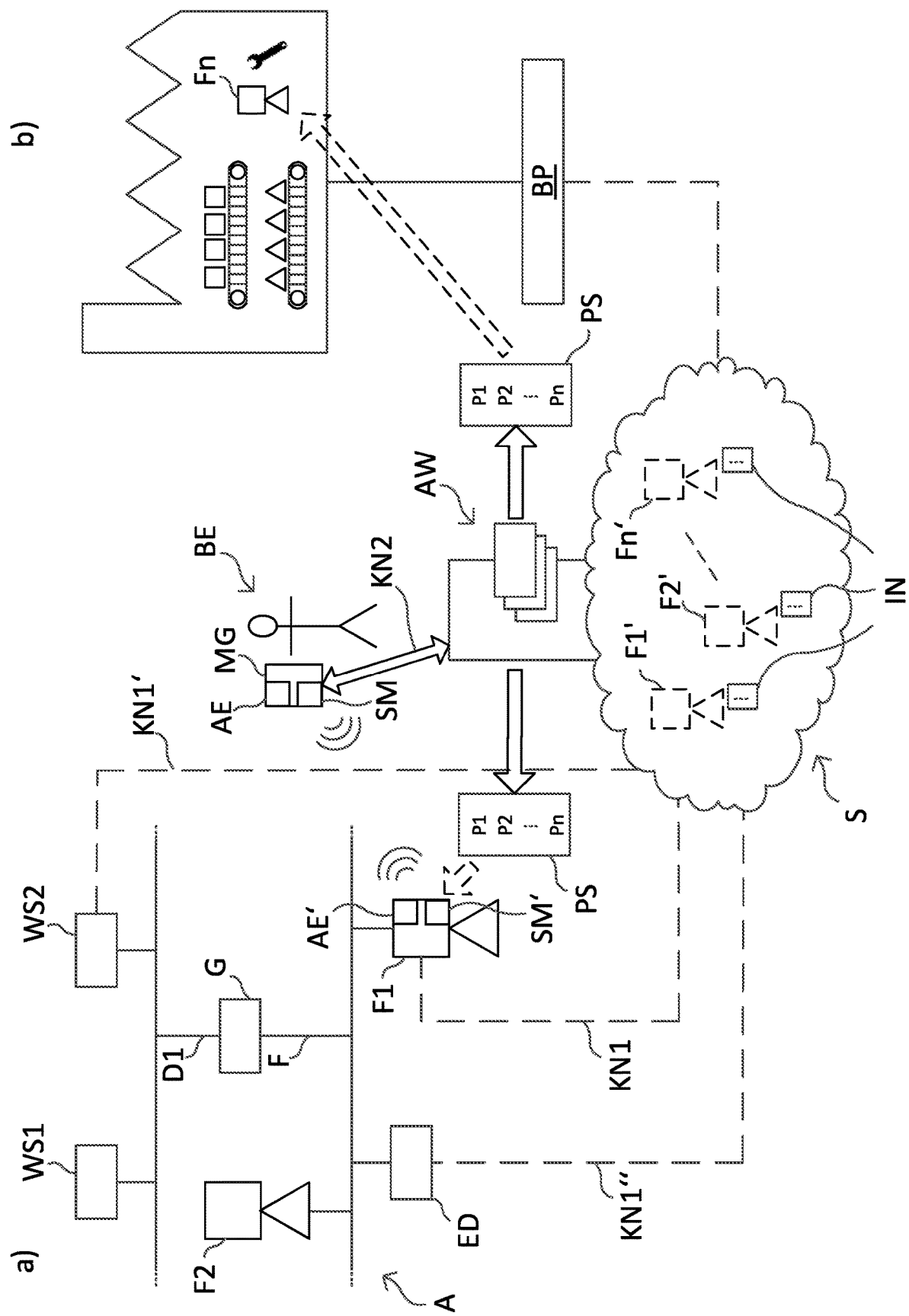

METHOD FOR PARAMETERIZING AN AUTOMATION FIELD DEVICE

CROSS-REFERENCE TO RELATED APPLICATIONS

The present application is related to and claims the priority benefit of German Patent Application No. 10 2017 104 912.6, filed on Mar. 8, 2017 and International Patent Application No. PCT/EP2018/053762 filed on Feb. 15, 2018, the entire contents of which are incorporated herein by reference.

TECHNICAL FIELD

The invention relates to a method for parameterizing an automation field device which is communicatively connected to a server via a first communication network.

BACKGROUND

Field devices that are used in industrial facilities are already known from the prior art. Field devices are often used in process automation, as well as in manufacturing automation. Field devices, in general, refer to all devices which are process-oriented and which supply or handle process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

In modern industrial plants, field devices are usually connected via wireless or wired communication networks to superordinate units. The wired communication networks are typically fieldbuses such as Profibus®, Foundation® Fieldbus, HART®, etc., or modern industrial communication networks or IT communication networks, such as (Industrial) Ethernet. The wireless communication networks are, for example, wireless fieldbuses such as WirelessHART®, etc., or wireless IT communication networks, such as WLAN. Higher-level units are control units, such as an SPS (storage programmable controller) or a PLC (programmable logic controller). The superordinate units are used for process control as well as for commissioning the field devices, among other things. The measured values detected by the field devices, especially, by sensors, are transmitted via the respective bus system to a (or possibly several) superordinate unit(s) that further process the measured values, as appropriate, and relay them to the control station of the installation. The control station serves for process visualization, process monitoring, and process control via the superordinate units. In addition, data transmission from the higher-level unit via the bus system to the field devices is also required, in particular for configuration and parameterization of field devices and for controlling actuators.

Field devices can be designed both as 4-conductor devices, wherein these field devices are supplied with electrical energy via at least one specific power line, and as 2-conductor devices, wherein the power supply and the data line of these field devices are provided via one and the same line.

Furthermore, particularly when using the field devices in extensive installations outdoors, such as pipelines, where externally supplying power to the measuring device via cables is difficult, it can be provided for the energy supply of the field devices to be implemented using batteries. Alternatively, the field device is designed to be energy-independent and has, for example, a solar module integrated into the housing.

Field devices sometimes have a multiplicity of parameters with the aid of which they can be adapted to an application or their functions can be adjusted. The parameters are divided into static and dynamic parameters. Static parameters represent time-invariant parameters. Dynamic parameters include non-modeled process characteristics input manually by the customer, such as the tank size of a tank filled with medium.

A so-called parameterization, in which parameter values are assigned to the individual parameters of a field device, is carried out, in particular, both during the startup of a field device and sometimes during maintenance of a field device, e.g., during servicing.

Due to the complexity of the parameters and due to the sometimes very large number of static and dynamic parameters of a field device, it is often not possible for an installation operator to parameterize his field device himself without external assistance. In addition to detailed knowledge of the meanings and the effect of the individual parameters, the installation operator requires precise knowledge of the specific applications in which his field devices are used, in order to parameterize a field device in an application-specific manner. Parameterization is often a complicated and time-consuming process even with the aid of an external service technician, who is typically provided by the field device manufacturer.

SUMMARY

Based upon this problem, the aim of the invention is to provide a method which allows a field device to be started up or maintained in a simple manner.

The aim is achieved by a method for parameterizing an automation field device which is communicatively connected to a server via a first communication network, having the following steps:

initiating the method by transmitting a command to parameterize or change the parameter values of the field device on the server;

transmitting identification information of the field device to the server;

ascertaining a digital image of the field device stored on the server using the transmitted identification information, which digital image contains information on the field device, in particular configuration settings of the field device, and measurement-location-relevant information and is designed in such a way as to reproduce the behavior of the field device in a simulated or emulated manner;

generating and proposing at least one parameter set for the field device using the field device information contained on the server by means of an application which is run on the server;

selecting and confirming by a user of the proposed parameter set; and transmitting the confirmed parameter set to the field device and parameterizing the field device using the transmitted parameter set.

The great advantage of the method according to the invention is that parameterization of a field device can be carried out in a simple manner. The user does not need any knowledge about the individual parameters of a field device or about the dependencies of the parameters upon one another, because the application automatically creates a parameter set appropriate for the application of the field device, preferably even the optimum parameter set for the application of the field device.

Field devices that have been mentioned in connection with the invention have already been described by way of example in the introductory part of the description.

In addition to the digital images of the field devices, digital images of the further components of the installation, e.g., of containers, pipelines, process units, etc., can also be located on the server.

According to an advantageous embodiment of the method according to the invention, the information about the field device is loaded onto the server during the ordering process of the field device and the digital image is generated, wherein any change in the configuration settings and the measurement-location-relevant information is transmitted to the server for updating the digital image. Any change in the physical field device during its service life thus causes the same change in the digital image of the field device. The field device and its digital image are therefore equivalent at any point in time.

According to a first variant of the method according to the invention, the method is initiated, in particular by an order platform, after an order of the field device, wherein the identification information is transmitted to the server, in particular during the manufacturing process of the field device, and the field device is configured with the transmitted parameter set after its manufacture. Each manufacturing step is transmitted to the server for modifying the digital image of the field device. After the field device has been manufactured, it is supplied to the customer with the created parameter set already described.

According to a second variant of the method according to the invention, the method is initiated by a user. In the course of maintenance work or when an already utilized field device is used in a new measurement location or the same, modified measurement location, a parameter set suitable for the measurement location can thus easily be created for the field device and this parameterized by means of the created parameter set.

An advantageous embodiment of the method according to the invention provides that the user transmit the command to the server to parameterize the field device via a mobile device, which is connected to the server via a second communication network and has a display and control element and/or voice input and voice output means, or via the field device directly, which has a display and control element and/or a voice input and voice output means, by means of input of a command to the respective display and control element or by means of voice input to the respective voice input and voice output means. The mobile device is, in particular, a control unit or a mobile configuration unit such as the "Field Xpert," which is produced and sold by the applicant, a laptop, a mobile terminal such as a tablet or smartphone, or a wearable item such as data goggles (for example, Google Glasses) or a smartwatch.

A display element is, in particular, a display—for example, an LCD or LED display. A control element is, in particular, a key, button, or switch. A combined display and control element in the sense of a touchscreen can also be provided.

A voice input means is preferably a microphone. A voice output means is preferably a loudspeaker.

An advantageous embodiment of the method according to the invention provides that the serial number and/or the TAG of the field device be transmitted to the server as identification information. Alternatively, they can also be separate designations used independently in the specific system.

An advantageous embodiment of the method according to the invention provides that the user input the serial number manually in the mobile device or the mobile device read the serial number from the field device. The serial number can be read out, for example, via a wired connection or a wireless connection, in particular by Bluetooth, NFC, or by WiFi embedded in the field device.

According to an advantageous embodiment of the method according to the invention, is it provided that, in the event that the serial number is not available, a location position of the field device, which, in particular, is determined via a GPS module on the field device or on the mobile device or is manually input via a control element and/or voice input element in the field device or in the mobile device, be transmitted to the server, or a photograph of the field device, which, in particular, was captured on-site by the mobile device, be transmitted to the server, wherein the server ascertains the digital image appropriate for the field device using the location position or the photograph of the field device. It can also be provided for internal designations of the installations, as can be found on an installation plan, to be transmitted, in order to be able to determine the field device.

An advantageous embodiment of the method according to the invention provides for the server to request further information about the field device from the user in the event that sufficient information for creating and suggesting a parameter set is not present on the server. Also, in this case, the user does not need any knowledge about the parameters of the field device. The additional information is queried, in particular, contextually. For example, the server could ask the user which process medium is flowing through a pipeline, in order to automatically determine the correct value of the density parameter of the field device for a flow measurement. If the measurement medium is not known to the user, he can also formulate its properties ("colorless," "odor neutral," etc.), whereby the server can autonomously infer the requested missing further information from these properties.

A first variant of the method according to the invention provides that further information be queried by voice output on the field device or on the mobile device via the respective voice input and voice output means.

A second variant of the method according to the invention provides that further information be queried graphically via a display and control element of the field device or of the mobile device.

An advantageous embodiment of the method according to the invention provides that the queries of the server be dynamically generated by means of cognitive algorithms as a function of the already existing information, the history of the installation in which the measurement point of the field device is located, and the responses of the user. This means that the server does not use queries from a pre-prepared catalog, but rather that these queries are newly created according to the situation. The missing information can thus be obtained in a targeted and time-saving manner.

The digital images of the further components of the installation can also be used for this purpose. These typically contain application profiles, which are used for creating the parameter set, or for creating the queries, from the cognitive algorithms.

Provision can also be made for several users to be brought in. For example, the queries can be transmitted simultaneously to a first user—the service technician—and to a second user—an employee in the service of the field device manufacturer. The cognitive algorithms then check and compare the responses of the two users and perform counter sampling to efficiently extract the further information.

An advantageous embodiment of the method according to the invention provides that the user transmit the further information to the server via voice input on the field device or on the mobile device or via input of the information on the respective display and control element.

An advantageous embodiment of the method according to the invention provides that the mobile device or the field device analyze the voice inputs by means of artificial intelligence, and, in particular, compare them to earlier voice inputs, and extract the commands and/or further information contained therein. The user therefore does not have to change his usual language style, but can formulate the response to the query of the server in his usual manner of expression. The mobile device or the field device then analyzes the voice response and extracts the relevant content and translates it into the further information. As an example, the user would not have to name the word, "water," in the question about the measurement medium, but could formulate a sentence from which the mobile device or the field device extracts the relevant information. The more frequently a user has worked with the system, the more reliably the relevant information is correctly extracted, since the system can learn the user's language style and manner of expression.

An advantageous embodiment of the method according to the invention provides that the application compare the image of the field device to further digital images of typical field devices or of field devices which are used in similar measurement locations, and allow the result of the comparison to be incorporated into the creation of the parameter set. In this way, proven parameter sets can be reused in similar applications. For example, it can be checked whether field devices of the identical type are used in similar applications. By checking their history, it can be determined whether a parameter set has been changed frequently, which indirectly allows conclusions to be drawn about the quality of the individual parameter sets. It can then be provided that only parameter sets that are used for longer than a specific defined time period be taken into account.

An advantageous embodiment of the method according to the invention provides that, to initiate the method, the user authenticate himself to the server by means of the field device or the mobile device by a fingerprint or by his voice, wherein, in the case of evaluation by his voice, characteristic properties of his voice, in particular the frequency spectrum of the voice color or the articulation or pronunciation, are analyzed. These two variants are very forgery-proof and allow only authorized users to parameterize a field device by means of the method according to the invention.

An alternative variant provides that the fieldbus network or the components (for example, superordinated units, gateways, remote I/O's, etc.) contained in the fieldbus network also have digital images on the server. It is thus possible to use the method according to the invention also for configuration/parameterization, start-up, and maintenance of the fieldbus network or the components of the fieldbus network.

BRIEF DESCRIPTION OF THE DRAWING

The invention is explained in greater detail with reference to the following FIGURES. The following is shown:

FIG. 1 shows a schematic overview of two exemplary embodiments of the method according to the present disclosure.

DETAILED DESCRIPTION

FIG. 1 shows a schematic overview of two exemplary embodiments of the method according to the invention. In a first exemplary embodiment, shown in FIG. 1 *a*), an automation system A is depicted. Several workstation PC's WS1, WS2 are connected to a data bus D1 in the command level of the installation. These workstation PC's serve as superordinated units (control system or control unit), inter alia, for process visualization, process monitoring, and for engineering, such as for operating and monitoring field devices. The data bus D1 operates, for example, according to the Profibus DP standard or according to the HSE (High Speed Ethernet) standard of the Foundation Fieldbus. Via a gateway G, which is also referred to as a linking device, field controller, or else as a segment coupler, the data bus D1 is connected to a fieldbus segment. The fieldbus segment is made up of several field devices F1, F2 which are connected to one another via a fieldbus F. The field devices F1, F2 can be either sensors or actuators. The fieldbus F works according to one of the well-known fieldbus standards, such as Profibus, Foundation Fieldbus, or HART. In addition to interfaces by means of which the field devices F1, F2 are connected to the fieldbus F, they can comprise field devices F1, F2 by means of which the field devices F1, F2 establish a secondary communication channel, in order to use IoT services, for example. For this purpose, field devices F1, F2 have a SIM card slot, and the second communication channel then uses LTE, LPWA, NB-IoT, 4G, or 5G.

A digital image F1', F2' is stored on a server S for each of the field devices F1, F2. In this case, it is provided, in particular, that the server S be made available by the field device manufacturer. A digital image F1', F2', . . . , Fn' is, advantageously, present on the server S for each of the field devices F1, F2, . . . , Fn sold by the field device manufacturer. The digital image F1', F2', . . . , Fn' of a field device F1, F2, . . . , Fn functions as its "plane image" and has the same properties and information IN as the physical field device F1, F2, . . . , Fn and, in particular, the same configuration settings, as well as the measurement-location-relevant information associated with the respective field device, such as the measurement medium, tank size, etc.

The server S can be reached, in particular, via the Internet and is preferably designed as a Cloud Computing Platform. Each change in the physical field device F1, F2, . . . , Fn is synchronized directly with the respective digital image F1', F2', . . . , Fn, so that it is identical at all times to the physical field device F1, F2, . . . , Fn.

In the first application example, the updated information about a first communication network KN1, KN1', KN1", which is preferably the Internet, is transmitted to the server S for this purpose. In a first variant, the field device F1, F2 itself is connected to the server S via the first communication network KN1. For example, the first communication network KN1 is constructed via the aforementioned additional communication channel, or a field device F1, F2 connects to the first communication network KN1 by means of the additional communication channel. In a second variant, one of the workstation PC's WS1, WS2 of the command level of the system A is connected to the first communication network and transmits the changes of one of the field devices F1, F2 to the server S. In a third variant, in the system A, at least one so-called edge device ED is provided that is connected to fieldbus F and logs relevant information about the field devices F1, F2 by listening to the data traffic of the fieldbus F or by submitting active requests to the field devices F1, F2. The edge device ED is connected to the first communication network KN1" and transmits the changes on a field device F1, F2 to the server S, which updates the respective associated digital image F1', F2'.

In the exemplary embodiment shown in FIG. 1 a), the measurement location of field device F1 is changed. In order for the field device F1 to be able to continue handling the measurement tasks accurately and precisely, it must be re-parameterized for this purpose. However, field devices F1, F2 usually have a large number of parameters, such that parameterization is a complex method for which trained personnel are required. The method according to the invention offers a possibility for allowing even inexperienced users a reliable parameterization of their field devices F1, F2:

In a first step, a user BE connects to the server S by means of a mobile device MG via a second communication network KN2 and authenticates himself to the server S, e.g., by means of a password, by means of a fingerprint, or by means of his voice. The mobile device MG is, in particular, a smartphone. It is advantageously provided that an application be installed on the smartphone MG, which application performs the connection to the server S and supports the user BE in the authentication and the subsequent method steps.

In a second method step, the user BE starts the parameterization of the field device F1. For this purpose, the user BE speaks a voice command into the mobile device MG. The mobile device MG has a voice input means SM, in particular a microphone, which picks up the voice command. The voice command is, for example: "Parameterize the field device!" or "Optimal parameter set for the field device." The mobile device MG analyzes the voice command and extracts from it the task to be solved. The analysis of the voice command takes place by means of artificial intelligence. In particular, the artificial intelligence learns from the user and "accustoms" itself to his formulation, articulation, and speech style in order to be able to correctly interpret the voice commands with high probability. For this purpose, the artificial intelligence can also compare the voice command to earlier voice commands in order to detect a match. Advantageously, it can be provided that the application software running on the mobile device MB be available in several languages and thereby allow a several languages to be recognized and output.

In a third method step, the mobile unit transmits the command for parameterizing the field device F1 to the server S. In order to determine the digital image F1' matching the field device F1, the server S sends a request to the mobile device MG. The mobile device MG then asks the user BE to name identification information of the field device F1 by voice output via the voice output means SM of the mobile device or by display on the display unit AE of the mobile device MG. Several options are available for this:

In a first variant, the user BE enters the identification information in the form of the serial number of the field device F1 or in the form of the tag of the field device F1 directly (via voice input or input on the control element AE) into the mobile device MG. If the identification information is not known to the user, the user BE connects the mobile device MG, in a second variant, to the field device F1, e.g., by means of a cable connection or via a wireless connection, in particular via Bluetooth, secure WiFi, or NFC, and reads out the identification information from the field device F1. If this is not possible, in a third variant, the mobile device MG ascertains the current location position of the user BE located in the vicinity of the field device F1, in particular via GPS or GSM triangulation, and transmits it to the server S, which then automatically ascertains the appropriate digital image F1', since this has the location information of the field device F1 as information IN. Alternatively, the user BE takes a photograph of the field device F1 using the mobile device MG and transmits it to the server S, so that the latter can identify the field device F1 on the basis of marked features. In a fourth variant, the user BE mentions environmental features of the field device F1 (for example: "I am in installation part B, section C1, and next to me is a large tank with the inscription DFS 34"), by means of which the server S ascertains the field device F1 probably involved and, for safety reasons, proposes it to the user BE for confirmation. If the environmental features are identified by means of voice input, the mobile device MG also here determines the relevant information from the voice input by means of artificial intelligence.

After the identification information has been transmitted and the digital image F1' corresponding to the field device F1 has been identified, an application AW running on the server S creates a parameter set PS for the field device F1. For this purpose, the application AW analyzes the information IN contained in the digital image F1'. If this information is sufficient to be able to create a parameter set PS, it is created by the application AW and transmitted to the mobile device MG or, if the field device is connected by means of the first communication network KN1, KN1', KN1", directly to the field device F1. This is then parameterized automatically, or, after confirmation of the user BE, with the established parameter set PS.

In the event that the information IN contained in the digital image F1' is not sufficient to be able to generate a parameter set PS, the server sends a query to the user BE. This is communicated to him via the mobile device, as was already the case when the identification information was queried. The user BE then mentions the required further information to the server S. In the event that this is not yet sufficient to be able to create the parameter set PS, further queries are made in the same manner until all necessary information is available.

The further information is retrieved either by voice output by means of the voice output means SM of the mobile device MG or by displaying the query on the display element AE of the mobile device MG. The user BE then states the further information by voice input on the voice input means SM of the mobile device or by input on the control element AE of the mobile device MG. If the additional information is given by voice input, the mobile device MG, in this case as well, determines the relevant information from the voice input by means of artificial intelligence.

The application AW here uses cognitive algorithms to create said queries. Cognitive algorithms represent a concept of machine learning. Using these cognitive algorithms, the application AW checks the already existing information IN of the digital image F1', as well as the history of the installation A in which the field device F1 is located. Found in the history is further information that may be required— for example, the information about an exchange of components. The application then determines by means of the cognitive algorithms what further information is still needed for the creation of the parameter set PS, and, on this basis, automatically generates a targeted query to the user BE. The response of the user BE is checked again and, if, as before, not all necessary additional information is present, further queries are made, taking into account the previous answers of the user, until sufficient information IN and further information are available to be able to create the parameter set PS for the field device F1.

In this way, the queries are made dynamically and are generated for the specific situation. Thus, no queries from a pre-prepared catalog are used, but, rather, these queries are created in a targeted manner, according to the situation.

Alternatively, it is provided that the field device F1 itself have display and control elements AE', and also voice input and voice output means SM'. In this case, all the above-described tasks of the mobile device (authentication to the server S, initiation of the method, transmission of the identification information, and requests/input of the further information) are handled by the field device F1. The advantage here is that, in this case, the user BE does not require a mobile device MG in order to parameterize the field device F1. However, the field device F1 must have sufficient power reserves in this case.

Furthermore, it can be provided that the user BE not be confined to the installation A, but can establish a connection with the server S from home or from his workstation. He can then download the created parameter set PS and take it to the installation A, and the field device F1, F2 can be parameterized on-site by means of the parameter set PS.

In a second application example, shown in FIG. 1 *b*), the parameter set PS is created directly during the manufacture of a field device Fn, after its order via an order platform BP. For this purpose, all the information IN which is known from the ordering process is first transmitted to the server S, wherein this server generates a digital image Fn' of the field device Fn. During the manufacturing process, further information is added simultaneously with each manufacturing stage.

The order platform also transmits the identification information of the field device Fn to the server S, so that its application AW can create the parameter set PS on the basis of the information IN present in the digital image Fn'. Also, in this case, it can be provided for further digital images of identical-type field devices to be used for creating the parameter set PS.

After the parameter set PS has been created, it is preferably transmitted directly to the production, so that the field device Fn is parameterized with the parameter set directly during the course of manufacture and can then be transferred to the customer in a completely parametrized state.

The invention claimed is:

1. A method for parameterizing an automation field device that is communicatively connected to a server via a first communication network, the method comprising:
   initiating the method by a user transmitting a command to parameterize or change the parameter values of the field device on the server, wherein the transmitting of the command includes transmitting the command from the user to the server via a mobile device, wherein the mobile device is connected to the server via a second communication network, and the mobile device has a display and control element and/or voice input and voice output means, or via the field device directly, and the field device has a display and control element and/or voice input and voice output means, by means of input of a command to the respective display and control element or by means of voice input to the respective voice input and voice output means;
   transmitting identification information of the field device to the server;
   ascertaining a digital image of the field device stored on the server using the transmitted identification information, said digital image containing information about the field device, including configuration settings of the field device and measurement-location-relevant information, wherein the digital image is designed to reproduce the behavior of the field device in a simulated or emulated manner;
   generating and proposing a parameter set for the field device using the field device information contained on the server using an application which is run on the server;
   selecting and confirming the proposed parameter set by the user; and
   transmitting the confirmed parameter set to the field device and parameterizing the field device using the transmitted parameter set.

2. The method according to claim 1, further comprising:
   loading the information onto the server via the field device during an ordering process of the field device; and
   creating the digital image on the server,
   wherein each change in the configuration settings and the measuring-point-relevant information is transmitted to the server for updating the digital image.

3. The method according to claim 1, wherein a serial number and/or a TAG of the field device are transmitted to the server as identification information.

4. The method according to claim 3, wherein the user manually enters the serial number in the mobile device, or the mobile device reads the serial number from the field device.

5. The method according to claim 4, further comprising:
   determining a location position of the field device via a GPS module on the field device or on the mobile device or manually inputting via a control element and/or voice input element in the field device or in the mobile device and transmitting the location position to the server; and
   ascertaining on the server the digital image appropriate for the field device using the location position.

6. The method of claim 4, further comprising:
   testing if the serial number of the field device is available;
   transmitting to the server a photograph of the field device; and
   ascertaining by the server the digital image appropriate for the field device using the photograph of the field device.

7. The method according to claim 1, further comprising:
   querying by the server further information about the field device from the user.

8. The method according to claim 7, wherein the querying of the further information is carried out by voice output on the field device or at the mobile device via the respective voice input and voice output means.

9. The method according to claim 7, further comprising:
   transmitting the further information from the user to the server via voice input on the field device or on the mobile device or via input of the further information on the respective display and control element.

10. The method according to claim 7, wherein the querying of the further information is carried out graphically via a display and control element of the field device or of the mobile device.

11. The method according to claim 7, wherein the queries of the server are dynamically generated by cognitive algorithms as a function of the already existing information, the history of the installation in which the measurement location of the field device is located, and the responses of the user.

12. The method according to claim 7, wherein the mobile device or the field device analyzes the voice inputs by means of artificial intelligence and compares the voice inputs to earlier voice inputs and extracts the commands and/or further information contained in in the voice inputs.

13. The method according to claim 1, further comprising:
comparing the digital image of the field device to further digital images of typical field devices or of field devices which are used in similar measurement locations; and
incorporating the result of the comparison into the creation of the parameter set.

14. The method according to claim 1, wherein, to initiate the method, the user authenticates himself to the server by means of the field device or the mobile device by a fingerprint or by his voice, wherein, in the case of evaluation by his voice, characteristic properties of his voice, in particular the frequency spectrum of the voice color or the articulation or pronunciation, are analyzed.

15. A method for parameterizing an automation field device that is communicatively connected to a server via a first communication network, the method comprising:

initiating the method by transmitting a command to parameterize or change the parameter values of the field device on the server, wherein the initiating is done by an order platform after an order of the field device;

transmitting identification information of the field device to the server, wherein the identification information is from a production process of the field device;

ascertaining a digital image of the field device stored on the server using the transmitted identification information, said digital image containing information about the field device, including configuration settings of the field device and measurement-location-relevant information, wherein the digital image is designed to reproduce the behavior of the field device in a simulated or emulated manner;

generating and proposing a parameter set for the field device using the field device information contained on the server using an application which is run on the server;

selecting and confirming the proposed parameter set by a user;

transmitting the confirmed parameter set to the field device and parameterizing the field device using the transmitted parameter set; and configuring the field device after the production process with the transmitted parameter set.

* * * * *